United States Patent
Thomas

(10) Patent No.: US 11,491,940 B2
(45) Date of Patent: Nov. 8, 2022

(54) SYSTEM AND METHOD FOR DETECTING IMPROPER POSTURE OF AN OCCUPANT USING A SEATBELT RESTRAINT SYSTEM

(71) Applicant: GM Global Technology Operations LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 285 days.

(21) Appl. No.: 16/389,497

(22) Filed: Apr. 19, 2019

(65) Prior Publication Data

US 2020/0331415 A1    Oct. 22, 2020

(51) Int. Cl.
*B60R 21/015* (2006.01)

(52) U.S. Cl.
CPC .. *B60R 21/01552* (2014.10); *B60R 21/01538* (2014.10); *B60R 21/01546* (2014.10)

(58) Field of Classification Search
CPC ........ B60R 21/01552; B60R 21/01548; B60R 21/01546; B60R 21/01538; B60R 21/01544; B60R 2022/4825; B60R 21/01512; B60R 21/015; B60R 2022/4891; B60R 21/0153; B60R 21/01542; B60R 21/01554; B60W 2540/223; B60W 2040/0818; G06K 9/00845; A61B 5/1116

See application file for complete search history.

(56) References Cited

U.S. PATENT DOCUMENTS

| | | | | |
|---|---|---|---|---|
| 7,830,246 B2* | 11/2010 | Hawkins | ............. | B60R 21/0152 |
| | | | | 340/425.5 |
| 2015/0251618 A1* | 9/2015 | Ghannam | ............... | B60R 22/48 |
| | | | | 340/457.1 |
| 2016/0368452 A1* | 12/2016 | Le | ..................... | B60R 21/01552 |
| 2017/0161575 A1* | 6/2017 | Banno | .................. | A61B 5/6893 |
| 2019/0094355 A1* | 3/2019 | Nakagawa | ............. | G01S 17/04 |
| 2019/0258263 A1* | 8/2019 | Wendel | .................. | B60N 2/002 |
| 2019/0347499 A1* | 11/2019 | Yanagawa | ............ | G06V 20/597 |

FOREIGN PATENT DOCUMENTS

WO    2016164793 A1    10/2016
WO    2019063470 A1    4/2019

* cited by examiner

*Primary Examiner* — Christian Chace
*Assistant Examiner* — Shayne M. Gilbertson
(74) *Attorney, Agent, or Firm* — Vivacqua Crane, PLLC

(57) ABSTRACT

A system for determining when an occupant in a motor vehicle seat and restrained by a seatbelt restraint system has improper posture. The system and method include: a seatbelt buckle sensor, a seatbelt payout sensor, an occupant posture sensor. Moreover, a control module executes code to: determine the presence of the seatbelt latchplate in the seatbelt buckle, determine whether the difference between the first seatbelt payout length when the seatbelt is buckled and the second seatbelt payout length is greater than a seatbelt payout length threshold, compare the image of the occupant to at least one of a stored image and a posture zone when the seatbelt payout length threshold is exceeded, and determine whether the occupant has improper posture based on the comparison of the captured image of the occupant and the at least one of the stored image and the posture zone.

21 Claims, 3 Drawing Sheets

SYSTEM AND METHOD FOR DETECTING IMPROPER POSTURE OF AN OCCUPANT USING A SEATBELT RESTRAINT SYSTEM

INTRODUCTION

The present disclosure relates to seatbelt restraint systems and methods for detecting an occupant in the vehicle seat having improper posture.

Seatbelt systems for restraining occupants in a motor vehicle, generally, employ seatbelt retractors. The seatbelt retractors have a spool around which a seatbelt webbing is wound. The seatbelt webbing may be unwound from the spool by a vehicle occupant and secured around the vehicle occupant by inserting a latch plate coupled to the seatbelt webbing into a seatbelt buckle. When not in use, the seatbelt retractor through the aid of a spring retracts the seatbelt webbing into one or more retractor spools. Moreover, seatbelt systems have employed a sensor in the seatbelt buckle to determine whether an occupant is belted. If the occupant is unbelted a warning is provided to the occupant to prompt the occupant to buckle their seatbelt.

Thus, while current seatbelt systems achieve their intended purpose, there is a need for a new and improved system and method for securing vehicle occupants in a vehicle seat. The new and improved method should be capable of determining occupant position and posture in a vehicle seat and provide a warning to the vehicle occupant or take an appropriate ride action when different improper postures of the occupant in the vehicle seat are detected.

SUMMARY

According to several aspects, a system for determining when an occupant in a motor vehicle seat and restrained by a seatbelt restraint system has improper posture is provided. The system includes a seatbelt buckle sensor for sensing a presence of a seatbelt latchplate in the seatbelt buckle to determine whether the seatbelt is buckled, a seatbelt payout sensor for sensing a first seatbelt payout length and sensing a second seatbelt payout length, an occupant posture sensor for capturing an image of an occupant in the motor vehicle seat and a control module. The control module is in communication with the seatbelt buckle sensor, the seatbelt payout sensor, and the occupant posture sensor. The control module has executable code to: determine the presence of the seatbelt latchplate in the seatbelt buckle, determine whether the difference between the first seatbelt payout length when the seatbelt latchplate is present in the seatbelt buckle and the second seatbelt payout length is greater than a seatbelt payout length change threshold, compare the image of the occupant captured by the occupant posture sensor to at least one of a stored image and a posture zone when the difference between the first seatbelt payout length and the second seatbelt payout length is greater than the seatbelt payout length change threshold, and determine whether the occupant has improper posture based on the comparison of the captured image of the occupant and the at least one of the stored image and the posture zone.

In accordance with another aspect of the present disclosure, the occupant posture sensor is at least one of an infrared sensor, an ultrasonic sensor and a visual spectrum camera sensor.

In accordance with yet another aspect of the present disclosure, the stored image is at least one of a reference posture image and an actual initial posture image.

In accordance with still another aspect of the present disclosure, the posture zone is at least one of a reference posture zone and an actual initial posture zone.

In accordance with yet another aspect of the present disclosure, the control module further comprises executable code to store the first seatbelt payout length within at least a first time window and a second time window.

In accordance with yet another aspect of the present disclosure, the reference posture image is selected based on the image of the occupant captured by the occupant posture sensor.

In accordance with yet another aspect of the present disclosure, the reference posture zone image is selected from a plurality of stored reference posture images based on a shape of the occupant as determined from the captured image of the occupant.

In accordance with yet another aspect of the present disclosure, the actual initial posture zone is determined from an actual initial posture image.

In accordance with yet another aspect of the present disclosure, the control module further comprises executable code to compare the image of the occupant captured by the occupant posture sensor to a stored image further comprises executable code to capture an image of an occupant in the vehicle seat within at least one of a first time window and a second time window and to store the image as the stored image.

In accordance with yet another aspect of the present disclosure, the control module further comprises executable code to determine whether the occupant has improper posture based on the comparison of the captured image of the occupant and at least one of the stored image and the posture zone further comprises executable code to determine whether at least one of a head, a torso and a leg of the occupant exceeds a posture threshold.

In accordance with yet another aspect of the present disclosure, the control module further comprises executable code to determine whether the occupant has improper posture based on the comparison of the captured image of the occupant and the at least one of the stored image and the posture zone further comprises executable code to determine whether at least one of a head, a torso and a leg of the occupant exceeds a posture threshold.

In accordance with yet another aspect of the present disclosure, the control module further comprises executable code to issue a message to the occupant when a determination is made that the occupant has improper posture.

In accordance with yet another aspect of the present disclosure, the control module further comprises executable code to take a ride action when a determination is made that the occupant has improper posture.

In accordance with yet another aspect of the present disclosure, the control module further comprises executable code to capture a second image of an occupant in the vehicle seat when seat movement is detected, and wherein the second image is stored as the stored image.

In accordance with yet another aspect of the present disclosure, the control module further comprises executable code to adjust the first seatbelt payout length when movement of the motor vehicle seat is detected.

In accordance with yet another aspect of the present disclosure, the control module further comprises executable code to adjust at least one of the actual initial posture image, reference posture image, actual initial posture zone and reference posture zone is adjusted based on vehicle movement.

In accordance with yet another aspect of the present disclosure, a method for determining when an occupant in a motor vehicle seat and restrained by a seatbelt restraint system has improper posture. The method includes sensing a presence of a seatbelt latchplate in the seatbelt buckle to determine whether the seatbelt is buckled using a seatbelt buckle sensor, storing a first seatbelt payout length after the seatbelt buckle sensor senses the presence of the seatbelt latchplate in the buckle, sensing a second seatbelt payout length, determining a difference between the first seatbelt payout length and the second seatbelt payout length, capturing an image of the occupant in the vehicle seat when the difference between the first seatbelt payout length and the second seatbelt payout length has exceeded the seatbelt payout length threshold, determining whether an occupant has improper posture based on the image of the occupant in the vehicle seat, and taking an action when the occupant has improper posture based on the image of the occupant in the vehicle seat.

In accordance with yet another aspect of the present disclosure, the method includes storing a stored image as at least one of a reference posture image, an actual initial posture image, a reference posture zone and an actual initial posture zone.

In accordance with yet another aspect of the present disclosure, the method further comprising storing the first seatbelt payout length within at least a first time window and a second time window In accordance with yet another aspect of the present disclosure, determining whether an occupant has improper posture based on the image of the occupant in the vehicle seat further comprises comparing the stored image to at least one of the reference posture image, the actual initial posture image, the reference posture zone and the actual initial posture zone.

In accordance with yet another aspect of the present disclosure, determining whether an occupant has improper posture based on the image of the occupant in the vehicle seat further comprises comparing the image of the occupant captured by the occupant posture sensor to a stored image.

In accordance with yet another aspect of the present disclosure, determining whether the occupant has improper posture based on the comparison of the captured image of the occupant and the at least one of the stored image and the posture zone further comprises determining whether at least one of a head, a torso and a leg of the occupant exceeds a posture threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
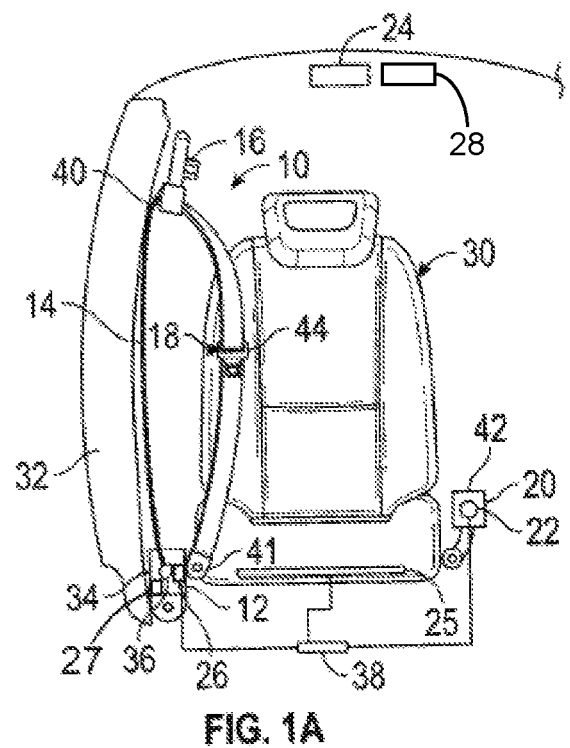
FIG. 1A is a front perspective view of a vehicle seat and a safety restraint system, according to an exemplary embodiment.

Referring to FIG. 1a, a safety restraint system 10 for a motor vehicle is illustrated, in accordance with an embodiment of the invention. Safety restraint system 10 includes a seatbelt retractor 12, a seatbelt webbing 14, a guide loop 16, a latchplate 18, a buckle 20, a seatbelt buckle sensor 22, occupancy sensors 24, 25, a seatbelt webbing payout sensor 26 and occupant posture sensor 28. Seatbelt retractor 12 is fixed to a structural member of the motor vehicle adjacent a vehicle seat 30. For example, seatbelt retractor 12 is bolted to the base of the B-pillar 32 or other structural member of the vehicle. Alternatively, the seat belt retractor 12 may be integrated with and fixedly attached to the base of the seat 30 of the motor vehicle. A frame 34 of seatbelt retractor 12 is configured to rotatably support a spool 36 for free rotation in the retractor 12.

A spring (not shown) is operatively attached to the retractor frame 34 at one end of the spring and to the spool 36 at another end of the spring to retract the seatbelt webbing 14 onto the spool 36 and into the retractor 12. The seatbelt webbing 14 is at least partially wound around the spool 36 for storing the seatbelt webbing 14 in the retractor 12 when the safety restraint system 10 is not in use. When the safety restraint system 10 is in use the seatbelt webbing 14 is unwound from the spool 36 and pulled out of the retractor 12 by a vehicle occupant. The seatbelt webbing 14 is typically made of a woven fabric material such as woven nylon or polyester.

The seatbelt webbing payout sensor 26 is in communication with the retractor spool 36. Webbing payout sensor 26 is configured to sense the rotation of the retractor spool 36. A computer or microprocessor control system 38 receives a spool rotation signal from the webbing payout sensor 26 and is configured to determine the length of webbing payout from the rotation of the spool 36 of the retractor 12.

Guide loop 16 is fixedly secured to the motor vehicle, generally, towards the top of the B-pillar 32 of the motor vehicle. An optional slot 40 is provided in guide loop 16 that receives and slidably engages the seatbelt webbing 14. The seatbelt webbing 14 generally extends from the retractor 12 up and along the B-pillar 32 and is threaded or routed through guide loop 16 where the seatbelt webbing 14 is directed down toward the base of the seat 30 and is secured at a terminal end 41 to a structural member of the motor vehicle or to the seat 30.

The latchplate 18 has a slot 44 through which the seatbelt webbing is threaded to slidably engage the latchplate 18 with the seatbelt webbing 14. The latchplate 18 is located on the seatbelt webbing 14, generally, between the guide loop 16 and the terminal end 41 of the seatbelt webbing 14. The buckle 20 is configured to releasably capture the latchplate 18. Typically, latchplate 18 is pressed into a slot 42 in buckle

20. After the latchplate 18 is fully inserted into the buckle 20 the latchplate 18 is locked in the buckle 20. A button on the buckle 20 is depressed to release the latchplate 18 from buckle 20.

The seatbelt buckle sensor 22 is provided in the seatbelt buckle 20. Buckle sensor 22 is configured to sense the presence of the latchplate 18. Buckle sensor 22 transmits a control signal to the microprocessor control system 38. The microprocessor control system 38 includes a control algorithm that receives the control signal from the buckle sensor 22 and determines whether the latchplate 18 is present in the seatbelt buckle 20.

One or more occupancy sensors 24, 25 are provided adjacent the vehicle seat 30 such as occupant cabin sensor 24 or in the vehicle seat 30 such as occupancy seat sensor 25. Occupant seat sensor 25 assess occupant presence via different means such as one or more pressure pads, weight pads, load cells, resistive pads and biometric sensors. Occupancy cabin sensor 24 outside the seat 30 would assess occupant presence via different means, such as via one or more cameras, RADARs, ultra-sonic sensors, infrared sensors, etc. Occupancy sensors 24, 25 are configured to sense the presence of a vehicle occupant (as indicated by reference number 301 in FIG. 3 and FIG. 4) in the seat 30. Each occupancy sensor 24, 25 transmits a control signal to the microprocessor control system 38. The microprocessor control system 38 includes a control algorithm that receives the control signal from the occupancy sensor 24, 25 and determines whether the occupant is present in the seat 30. Occupancy sensors 24, 25 may detect certain objects as occupants. Occupancy sensors 24, 25 may have one or more detection thresholds to help distinguish people from objects, detect the size of a person and detect the location of a person relative to the seating surface. Additionally, an occupant posture sensor 28 is provided in the vehicle passenger compartment 45 for detecting an initial posture of a vehicle occupant in the seat 30. Occupant posture sensor 28 can be the same as occupancy sensors 24, 25 or different from them. Subsequently, the initial posture of the vehicle occupant can be compared to a current posture of the vehicle occupant to determine if the posture of the vehicle occupant has changed. The occupant posture sensor 28 is a vision based or wave-based sensor system that employs infrared waves, ultrasonic waves, RADAR, LASERs or similar technology. In an embodiment of the present disclosure, an image of the current posture of a vehicle occupant in the vehicle seat is captured by the occupant posture sensor. The image of the current posture of a vehicle occupant in the vehicle seat is compared to a reference image or an earlier obtained image of an occupant sitting erect in the vehicle seat and sitting against the seatback of the vehicle seat 30. In an embodiment of the present disclosure the image of at least one of the occupant's head, torso, or legs is compared to a zone or zones around the image of an occupant sitting erect in the vehicle seat and sitting against the seatback of the vehicle seat 30 and this comparison is used to determine whether the occupant has improper posture.

Figure 1B:
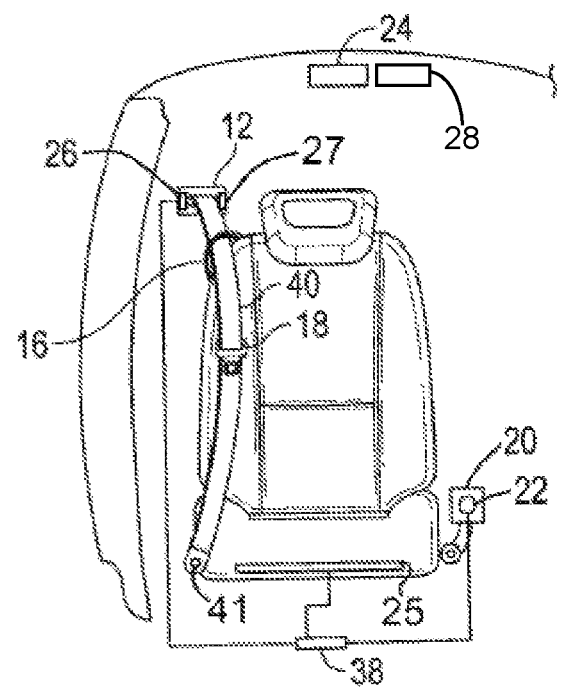
FIG. 1B is a front perspective view of a vehicle seat and an alternate safety restraint system, according to an exemplary embodiment.
Figure 1C:
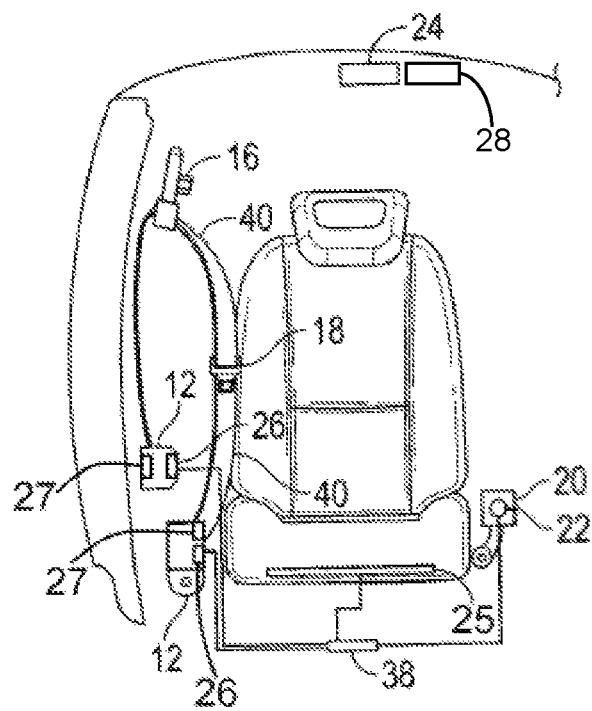
FIG. 1C is a front perspective view of a vehicle seat and yet another alternate safety restraint system, according to an exemplary embodiment.
Figure 1D:
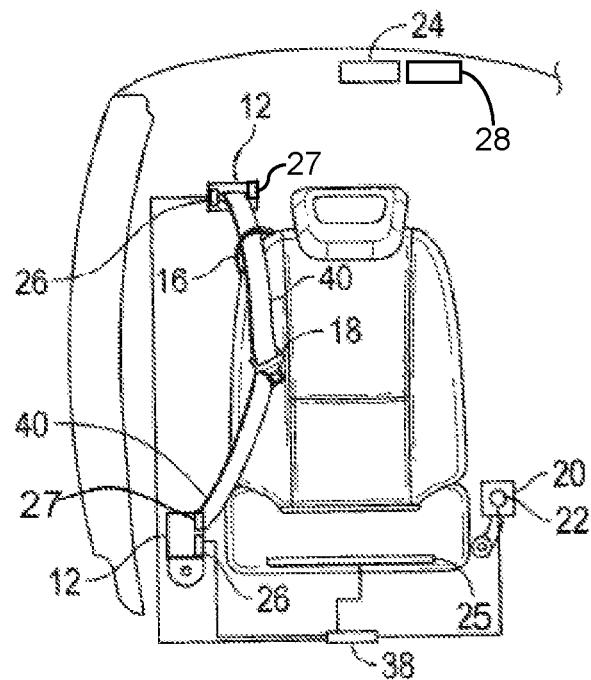
FIG. 1D is a front perspective view of a vehicle seat and still another alternate safety restraint system, according to an exemplary embodiment.

FIGS. 1B, 1C and 1D show alternative seatbelt arrangements. FIG. 1B shows a shelf mount location for the retractor 12 and the guide loop 16 is mounted to or in proximity of the seat 30. FIGS. 1C and 1D show seatbelt systems with two retractors 12. One or both of the retractors 12 have a webbing payout sensor 26. Each webbing payout sensor 26 transmits a control signal to the microprocessor control system 38. The latchplate 18 is sewn into seat belt webbing 14. For embodiments having two webbing payout sensors 26, the method utilizes the two measured payout lengths together. In one embodiment of the present invention, a correction factor is multiplied into one or both payout lengths to produce a more accurate determination by the method of the present disclosure. In another embodiment, systems with two payout sensors 26 the method considers each of the payout lengths individually with different thresholds and runs each routine separately for each sensor input.

The present disclosure includes a plurality of algorithms or methods for determining the posture of a vehicle occupant in the seat 30 based on the receipt and processing by microprocessor control system 38 of the control signals from the seatbelt buckle sensor 20, the occupancy sensors 24, 25, the seatbelt payout sensors 26 and occupant posture sensor 28. Microprocessor control system 38 includes computer memory to store the plurality of algorithms or methods. Moreover, microprocessor control system 38 includes a processor to execute the computer code that defines the plurality of algorithms or methods. The plurality of algorithms or methods utilize the control signals provided by the seatbelt buckle sensor 20, occupancy sensors 24, 25, seatbelt payout sensors 26 and occupant posture sensor 28 to determine the posture of a vehicle occupant in the seat 30 and decide whether the determined occupant posture requires an action such as a message or a ride action and either issue a message to the vehicle occupant or active a ride action.

Figure 2:
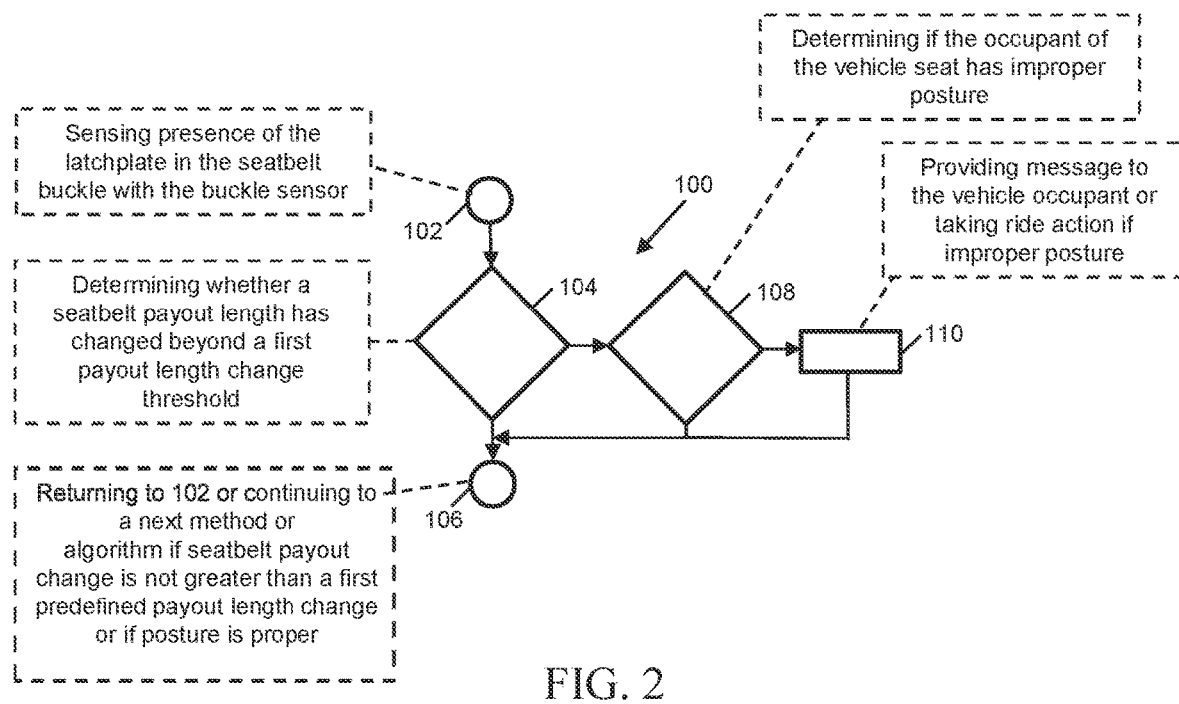
FIG. 2 is a flowchart illustrating a method for detecting occupant position in a vehicle seat, according to an exemplary embodiment.

Referring now to FIG. 2, a flowchart illustrating a method 100 for detecting occupant position in a vehicle seat, in accordance with the present invention. More specifically, method 100 is configured to determine whether an occupant is positioned forward on the vehicle seat, a child occupant is lying laterally on the seat, multiple occupants are sitting on one seat and some or all are restrained with the seatbelt, a child occupant is inboard or outboard, an occupant is angled in the seat, occupant is slouching in the seat, an adult or child is leaning forward in the seat, an occupant is twisted in the seat, for example. The method 100 starts at block 102 after a determination is made that an occupant is present in the vehicle seat 30 and the occupant is buckled. Occupant presence is determined based on the output of occupant presence sensors 24, 25. An occupant is determined to be buckled based on the presence of the latchplate 18 in the seatbelt buckle 20 as sensed by the buckle sensor 22. At block 104, a determination is made whether a seatbelt payout length has changed beyond a first payout length change threshold, which in an exemplary embodiment is the stored static length. The first payout length change threshold is a calibratable value or hard coded into the method or algorithm.

For method 100, the stored static length is determined by one of the following approaches: a) the actual payout length when the seatbelt is buckled, b) the average payout length over a predetermined time window starting at the time the seatbelt is buckled, c) the minimum payout length over a predetermined time window starting at the time of seatbelt buckling (to account for an occupant leaning forward or twisting while or right after buckling), d) the average or minimum payout length between a predetermined time window that starts and stops at predetermined times after buckling, e) the minimum payout length before the seatbelt payout increases (or increases beyond a predetermined amount), and alternatively limited to within a predetermined time window after buckling, f) if the ALR function in the seatbelt retractor has activated, then the stored static length is the minimum payout length within a predetermined time window after ALR activation, and g) if a buckled occupant is present in the vehicle seat, any of the above stored static length determination methods may be used to determine stored static length, however, the stored static length is determined after the buckled occupant has retracted the seatbelt to remove slack in the seatbelt webbing. For the above enumerated examples, the window for determining the stored static length is alternatively terminated once the rate of seatbelt webbing retraction exceeds a predetermined rate. If the seatbelt payout change is not greater than a first predefined payout length change, then the method 100 continues at block 106. At block 106 the method 100 continues to the next method or algorithm or returns to block 102.

However, if the seatbelt payout length change is greater than the first payout length change threshold, then the method 100 continues at block 108. At block 108, a determination is made whether the occupant of the vehicle seat has improper posture. Improper posture herein is defined, for example, as an occupant that is positioned forward on the vehicle seat, a child occupant that is lying laterally on the seat, multiple occupants sitting on one seat and some or all are restrained with the seatbelt, a child occupant that is inboard or outboard, an occupant that is angled in the seat, occupant that is slouching in the seat, an adult or child that is leaning forward in the seat, or an occupant that is twisted in the seat.

If at block 108, a determination is made that the occupant of the vehicle seat has improper posture, then method 100 continues to block 110. At block 110 a message is provided to the vehicle occupants and/or a ride action is taken. The message provided to the vehicle occupants are visual, audible, haptic, or a combination thereof. For example, the messages and ride actions that may be taken are: a) instructing the occupant to correct the occupant's posture, b) preventing the ride from starting, c) taking the vehicle and parking the vehicle in a local low risk location, and d) remotely resetting the system, viewing the interior environment to assess the situation or dialogue with the occupant and e) turning on a message icon, making an audible sound, vibrating a seat or some combination thereof. After block 110 the method continues to block 106. From block 106 the method 100 continues to the next method or algorithm or returns to block 102.

If at block 108, a determination is made that the occupant of the vehicle seat does not have improper posture, then method 100 continues to block 106. From block 106 the method 100 continues to the next method or algorithm or returns to block 102.

In an exemplary embodiment of the present invention, improper posture of the occupant, as determined at block 108, is determined by capturing an image of the occupant and comparing the captured image to a posture image such as a reference posture image or an actual initial posture image. For example, the actual initial posture image is determined from a stored image of the occupant in the vehicle seat 30 within a first time window starting when the occupant inserts the latchplate 18 into the seatbelt buckle 20. The length of the first time window is calibratable or hardcoded. Within the first time window, the actual initial image of the occupant that was stored is, for example, the proper or the most erect posture of the occupant. Alternatively, the reference posture image is selected from a plurality of stored occupant posture images of occupants with erect posture. The selection of the stored occupant posture images as a reference posture image is based on occupant shape. A current image of the occupant is compared to the stored occupant posture images and a shape matched stored occupant posture image is selected as the reference posture image.

Alternatively, the actual initial posture image is, for example, an actual image of the occupant captured within the second time window starting from when the occupant is present in the vehicle seat 30 until the latchplate 18 is sensed in the seatbelt buckle 20. The image selected as the actual initial posture image is, for example, an image of the occupant when the occupant is most erect in the vehicle seat 30.

Figures 3, 4:
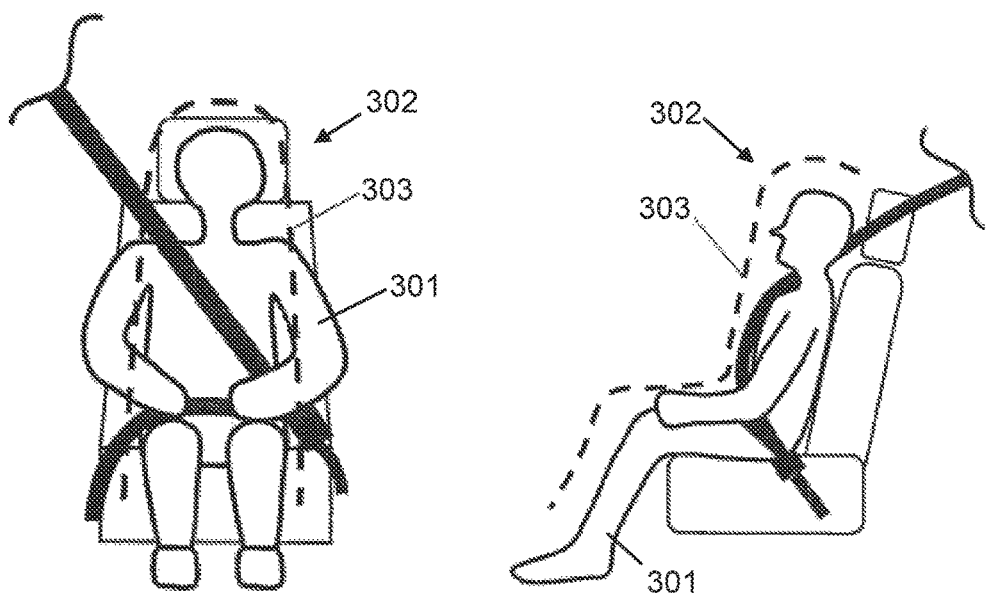
FIGS. 3 and 4 are front and side views illustrating an occupant seated in vehicle seat and restrained by seatbelt webbing of safety restraint system, according to an exemplary embodiment.

Referring now to FIGS. 3 and 4, a front and side view of an occupant 301 seated in vehicle seat 30 and restrained by seatbelt webbing 14 of safety restraint system 10 is illustrated, in accordance with an embodiment of the present invention. A posture zone 302 is defined around the occupant 301, as illustrated by dashed boundary line 303. In an example of the present invention, the posture zone 302 is an actual initial posture zone. The actual initial posture zone is defined as the space within which the occupant occupies as determined from a stored image of the occupant in the vehicle seat 30 captured within a first time window when the occupant inserts the latchplate 18 into the seatbelt buckle 20, herein referred to as the actual initial posture image. Alternatively, the actual initial posture zone is defined as a space outside the space in which the occupant occupies as determined from a stored image of the occupant in the vehicle seat 30 captured within a first time window when the occupant inserts the latchplate 18 into the seatbelt buckle 20. The actual initial posture zone is, in an exemplary embodiment, the shape of the occupant or the actual initial posture zone boundary is defined as a perimeter around the occupant that is larger than the occupant as illustrated in FIGS. 3 and 4. The increase in the boundary line 303 is a calibratable input or is hardcoded into the method 100.

Alternatively, the posture zone 302 is a reference image posture zone. The reference image posture zone, for example, is selected from a plurality of stored occupant posture images of occupants with erect posture, herein referred to as the reference posture image. The selection of the reference posture image is based on occupant size. A current image of the occupant is compared to the plurality of stored occupant posture images and a shape matched stored occupant posture image is selected as the reference posture image. In an example of the present invention, the reference image posture zone is defined as the space within which the reference posture image occupies. Alternatively, the reference image posture zone is defined as a space outside the space in which the reference posture image occupies. The reference image posture zone is, in an exemplary embodiment, the shape of the occupant in the reference posture image or the reference image posture zone boundary is defined as a perimeter around the occupant in the reference posture image that is larger than the occupant as illustrated in FIGS. 3 and 4. The increase in the boundary size can be a calibratable input or could be hardcoded into method 100.

Moreover, different posture thresholds to detect whether an occupant's current posture is improper are established for different occupant positions. The posture thresholds are, for example, the amount an occupant's body overlaps posture zone 302, the actual initial posture image, or the reference posture image. In an embodiment of the present disclosure, improper posture is when at least one of the head, torso and legs is located outside of posture zone 302, the actual initial posture image, or the reference posture image by the amount that exceeds the posture threshold. Alternatively, improper posture is when at least one of the head, torso and legs is located within posture zone 302, the actual initial posture image, or the reference posture image by the amount that exceeds the posture threshold. The detection method used to detect improper posture has the capability to ignore arms, hats, and other objects to prevent false determination of improper posture. In addition, the method 100 may remove the head, the legs or both. The method also has the ability to specify how far or how much overlap is needed to reach the posture threshold. This can be a calibratable input or it could be hard coded in to the algorithm.

The posture zone 302, the actual initial posture image, the reference posture image and first seatbelt payout length is modified when the seat position is adjusted to match the seat position movement. Thus, the posture zone 302, the actual initial posture image, the reference posture image, and seatbelt payout length change threshold are adjusted in accordance with vehicle seat movement to match the seat movement. For example, posture zone 302 will move forward or rearward or up or down or tilt with forward or rearward or up or down or tilt adjustment of the vehicle seat. The occupancy cabin sensor 24 detects the seat movement, or sensors on the seat mechanisms can detect the seat movement. First seatbelt payout length is adjusted based on seat movement.

Alternatively, an image of the occupant is captured once the seat movement has stopped. The captured image of the occupant is used to create a new actual initial posture image zone which is an image of acceptable posture.

The size of the actual initial posture image, the reference posture image or posture zone, the shape of the actual initial posture image, the reference posture image or posture zone, and the posture zone threshold may be modified based on either time or vehicle motion. For example, adjustments to the size of the posture zone, the shape of the posture zone, and the posture zone threshold are made to enable more occupant movement prior to messaging or ride actions or enable less movement prior to messaging or ride actions. For example, once a vehicle is moving, the amount of occupant movement before messaging and ride actions may be reduced and once the vehicle has stopped, the amount of occupant movement before messaging and ride actions may be expanded. As another example, the method could enable more occupant movement for a time period allowing an occupant to reach an object and then allow less occupant movement after a time period when the system determines that the occupant was reaching for an object and exceeded the actual initial posture image, the reference posture image, exceeded or entered a posture zone, or exceeded a posture threshold. Messaging or ride actions may be delayed for a specific amount of time.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining when an occupant in a motor vehicle seat and restrained by a seatbelt restraint system has improper posture, the system comprising:
    a seatbelt buckle sensor for sensing a presence of a seatbelt latchplate in a seatbelt buckle to determine whether a seatbelt is buckled;
    a seatbelt payout sensor for sensing a first seatbelt payout length and sensing a second seatbelt payout length;
    an occupant posture sensor for capturing an image of an occupant in the motor vehicle seat;
    a control module in communication with the seatbelt buckle sensor, the seatbelt payout sensor, and the occupant posture sensor, wherein the control module has executable code to:
        determine the presence of the seatbelt latchplate in the seatbelt buckle;
        determine whether a difference between the first seatbelt payout length when the seatbelt latchplate is present in the seatbelt buckle and the second seatbelt payout length is greater than a seatbelt payout length change threshold;
        compare the image of the occupant captured by the occupant posture sensor to at least one of a stored image and a posture zone when the difference between the first seatbelt payout length and the second seatbelt payout length is greater than the seatbelt payout length change threshold; and
        determine whether the occupant has improper posture based on the comparison of the captured image of the occupant and the at least one of the stored image and the posture zone;
        wherein the image of the occupant in the vehicle seat is captured in response to the control module determining that the difference between the first seatbelt payout length and the second seatbelt payout length is greater than the seatbelt payout length change threshold.

2. The system of claim 1, wherein the occupant posture sensor is at least one of an infrared sensor, an ultrasonic sensor and a visual spectrum camera sensor.

3. The system of claim 1, wherein the stored image is at least one of a reference posture image and an actual initial posture image.

4. The system of claim 3 wherein the posture zone is at least one of a reference posture zone and an actual initial posture zone.

5. The system of claim 1, wherein the control module further comprises executable code to store the first seatbelt payout length within at least a first time window and a second time window.

6. The system of claim 3, wherein the reference posture image is selected based on the image of the occupant captured by the occupant posture sensor.

7. The system of claim 4 wherein the reference posture zone is selected from a plurality of stored reference posture images based on a shape of the occupant as determined from the captured image of the occupant.

8. The system of claim 4 wherein the actual initial posture zone is determined from an actual initial posture image.

9. The system of claim 1, wherein the control module further comprises executable code to compare the image of the occupant captured by the occupant posture sensor to a stored image further comprises executable code to capture the image of the occupant in the vehicle seat within at least one of a first time window, starting when the occupant inserts the latchplate into the seatbelt buckle, and a second time window, starting from when the occupant is present in the vehicle seat until the latchplate is sensed in the seatbelt buckle, and to store the image as the stored image.

10. The system of claim 3, wherein the control module further comprises executable code to determine whether the occupant has improper posture based on the comparison of the captured image of the occupant and the at least one of the stored image and the posture zone further comprises executable code to determine whether at least one of a head, a torso and a leg of the occupant exceeds a posture threshold.

11. The system of claim 4, wherein the control module further comprises executable code to determine whether the occupant has improper posture based on the comparison of the captured image of the occupant and the at least one of the stored image and the posture zone further comprises executable code to determine whether at least one of a head, a torso and a leg of the occupant exceeds a posture threshold.

12. The system of claim 4 wherein the control module further comprises executable code to adjust at least one of the actual initial posture image, the reference posture image, the actual initial posture zone and the reference posture zone is adjusted based on vehicle movement.

13. A method for determining when an occupant in a motor vehicle seat and restrained by a seatbelt restraint system has improper posture, the method comprising:
   sensing a presence of a seatbelt latchplate in a seatbelt buckle to determine whether a seatbelt is buckled using a seatbelt buckle sensor;
   storing a first seatbelt payout length after the seatbelt buckle sensor senses the presence of the seatbelt latchplate in the buckle;
   sensing a second seatbelt payout length after the first seatbelt payout length;
   determining a difference between the first seatbelt payout length and the second seatbelt payout length;
   capturing an image of the occupant in the vehicle seat when the difference between the first seatbelt payout length and the second seatbelt payout length has exceeded a seatbelt payout length change threshold;
   determining whether an occupant has improper posture based on the captured image of the occupant in the vehicle seat;
   performing at least one of issuing a message to the occupant and taking a ride action when the occupant has improper posture based on the image of the occupant in the vehicle seat; and
   capturing the image of the occupant in the vehicle seat in response to the control module determining that the difference between the first seatbelt payout length and the second seatbelt payout length is greater than the seatbelt payout length change threshold.

14. The method of claim 13 further comprising storing a stored image as at least one of a reference posture image, an actual initial posture image, a reference posture zone and an actual initial posture zone.

15. The method of claim 13, further comprising storing the first seatbelt payout length within at least a first time window and a second time window.

16. The method of claim 14, wherein determining whether an occupant has improper posture based on the image of the occupant in the vehicle seat further comprises comparing the captured image to at least one of the reference posture image, the actual initial posture image, the reference posture zone and the actual initial posture zone.

17. The method of claim 16, wherein determining whether the occupant has improper posture based on the comparison of the captured image of the occupant and the at least one of the stored image and the posture zone further comprises determining whether at least one of a head, a torso and a leg of the occupant exceeds a posture threshold.

18. A system for determining when an occupant in a motor vehicle seat and restrained by a seatbelt restraint system has improper posture, the system comprising:
   a seatbelt buckle sensor for sensing a presence of a seatbelt latchplate in a seatbelt buckle to determine whether a seatbelt is buckled;
   a seatbelt payout sensor for sensing a first seatbelt payout length and sensing a second seatbelt payout length;
   an occupant posture sensor for capturing an image of an occupant in the motor vehicle seat;
   a control module in communication with the seatbelt buckle sensor, the seatbelt payout sensor, and the occupant posture sensor, wherein the control module has executable code to:
      determine the presence of the seatbelt latchplate in the seatbelt buckle;
      determine whether a difference between the first seatbelt payout length when the seatbelt latchplate is present in the seatbelt buckle and the second seatbelt payout length is greater than a seatbelt payout length change threshold;
      compare the image of the occupant captured by the occupant posture sensor to a posture zone, defined by a boundary line extending around and spaced from the occupant, when the difference between the first seatbelt payout length and the second seatbelt payout length is greater than the seatbelt payout length change threshold; and
      determine whether the occupant has improper posture based on the comparison of the captured image of the occupant and the posture zone; and
      wherein the image of the occupant in the vehicle seat is captured in response to the control module determining that the difference between the first seatbelt payout length and the second seatbelt payout length is greater than the seatbelt payout length change threshold.

19. The system of claim 1, wherein the control module further comprises executable code to capture a second image of an occupant in the vehicle seat when movement of the seat as adjusted by the occupant is detected, and wherein the second image is stored as the stored image; and
   wherein the control module further comprises executable code to perform at least one of issuing a message to the occupant and taking a ride action when a determination is made that the occupant has improper posture, further defined as:
      instructing the occupant to correct the occupant's posture;
      preventing the ride from starting;
      taking the vehicle and parking the vehicle in a local low risk location;
      remotely resetting the system, viewing the interior environment to assess the situation or dialogue with the occupant; and
      turning on a message icon, making an audible sound, vibrating a seat or some combination thereof.

20. The method of claim 13, further comprising:
   capturing, using the control module having executable code, a second image of an occupant in the vehicle seat when movement of the seat as adjusted by the occupant is detected, and storing the second image as the stored image; and
   performing, using the control module having executable code, at least one of issuing a message to the occupant and taking a ride action when a determination is made that the occupant has improper posture, further defined as:
      instructing, using the control module having executable code, the occupant to correct the occupant's posture;
      preventing, using the control module having executable code, the ride from starting;

taking, using the control module having executable code, the vehicle and parking the vehicle in a local low risk location;

remotely, using the control module having executable code, resetting the system, and viewing the interior environment to assess the situation or dialogue with the occupant; and turning on a message icon, making an audible sound, and vibrating a seat or some combination thereof.

21. The system of claim 18, wherein the control module further comprises executable code to capture a second image of an occupant in the vehicle seat when movement of the seat as adjusted by the occupant is detected, and wherein the second image is stored as the stored image; and wherein the control module further comprises executable code to perform at least one of issuing a message to the occupant and taking a ride action when a determination is made that the occupant has improper posture, further defined as:

instructing the occupant to correct the occupant's posture;

preventing the ride from starting;

taking the vehicle and parking the vehicle in a local low risk location;

remotely resetting the system, viewing the interior environment to assess the situation or dialogue with the occupant; and turning on a message icon, making an audible sound, vibrating a seat or some combination thereof.

* * * * *